(12) United States Patent
Essing et al.

(10) Patent No.: US 11,573,112 B2
(45) Date of Patent: Feb. 7, 2023

(54) DOSING DEVICE FOR DISPENSING A PREDETERMINED AMOUNT OF LIQUID, IN PARTICULAR A PREDETERMINED AMOUNT OF WATER

(71) Applicant: COLLOMIX GMBH, Gaimersheim (DE)

(72) Inventors: Alexander Essing, Ingolstadt (DE); Martin Baumann, Gaimersheim (DE)

(73) Assignee: Collomix GmbH, Gaimersheim (DE)

(*) Notice: Subject to any disclaimer, the term of this patent is extended or adjusted under 35 U.S.C. 154(b) by 211 days.

(21) Appl. No.: 16/840,661

(22) Filed: Apr. 6, 2020

(65) Prior Publication Data

US 2020/0319008 A1 Oct. 8, 2020

(30) Foreign Application Priority Data

Apr. 5, 2019 (DE) .............................. 102019109009

(51) Int. Cl.
*G01F 13/00* (2006.01)
*B67D 7/30* (2010.01)

(52) U.S. Cl.
CPC ........... *G01F 13/006* (2013.01); *B67D 7/302* (2013.01)

(58) Field of Classification Search
CPC ........ B67D 7/302; B67D 7/0288–0294; B67D 1/06; G01F 15/003; G01F 11/006; F16M 13/02; B05B 15/60–62; F16L 3/003
USPC ................................ 222/144.5, 180; 248/79
See application file for complete search history.

(56) References Cited

U.S. PATENT DOCUMENTS

| 103,299 | A | * | 5/1870 | Chapin | ................... | A47G 21/18 |
| | | | | | | 248/79 |
| 103,300 | A | * | 5/1870 | Chapin | ................... | A47G 21/18 |
| | | | | | | 248/79 |
| 473,716 | A | * | 4/1892 | Stevens | ................... | A62C 31/28 |
| | | | | | | 248/77 |

(Continued)

FOREIGN PATENT DOCUMENTS

| DE | 4029620 A1 | 4/1992 |
| DE | 69707937 T2 | 4/2002 |

(Continued)

OTHER PUBLICATIONS

DE60221303_MT; machine translation into english of DE60221303; obtained on May 21, 2022 from https://worldwide.espacenet.com/.*

*Primary Examiner* — Paul R Durand
*Assistant Examiner* — Randall A Gruby
(74) *Attorney, Agent, or Firm* — Laurence A. Greenberg; Werner H. Stemer; Ralph E. Locher

(57) ABSTRACT

A dosing device for dispensing a predetermined amount of liquid, in particular a predetermined amount of water, has a housing with a liquid inlet, a liquid outlet, and a flow channel therebetween. A valve element in the flow path can be opened and closed. A measuring device measures the flow rate through the flow channel in the direction of the liquid outlet. A controller has an operating unit or is coupled to an operating unit for signal transmission. The dosing device is actuatable by the operating unit. The controller is further coupled in terms of control technology to the valve element and to the measuring device, the controller holding the valve element in an open position or moving it to an open position when the dosing device is actuated.

28 Claims, 7 Drawing Sheets

(56) References Cited

U.S. PATENT DOCUMENTS

| | | | | | |
|---|---|---|---|---|---|
| 1,476,810 | A | * | 12/1923 | Gilsenan | A62C 31/28 239/282 |
| 2,070,495 | A | * | 2/1937 | Strutz | A47G 19/2222 D7/396.2 |
| 2,460,542 | A | * | 2/1949 | Smith | A47G 19/2222 24/339 |
| 3,178,070 | A | * | 4/1965 | Leland | E03D 9/005 222/394 |
| 4,196,747 | A | * | 4/1980 | Quigley | F16K 15/03 604/247 |
| 4,247,070 | A | * | 1/1981 | Dirksing | E03D 9/038 4/227.1 |
| D264,010 | S | * | 4/1982 | Graf | 248/77 |
| 4,807,664 | A | * | 2/1989 | Wilson | A01G 25/165 239/69 |
| 4,883,199 | A | * | 11/1989 | Ouarve | B67D 7/303 222/14 |
| 5,184,309 | A | * | 2/1993 | Simpson | B67D 7/425 141/392 |
| 6,035,940 | A | * | 3/2000 | Bourke | A62C 31/24 134/198 |
| 6,357,300 | B1 | * | 3/2002 | Johnson | G01F 11/006 222/14 |
| 6,443,328 | B1 | * | 9/2002 | Fehl | B67D 7/425 222/14 |
| 6,659,306 | B2 | * | 12/2003 | Boyle | G01F 3/10 222/14 |
| 7,603,726 | B2 | * | 10/2009 | Sawalski | B65D 83/759 4/223 |
| 8,123,079 | B2 | * | 2/2012 | Schroeder | B67D 1/0086 222/538 |
| 8,215,522 | B2 | * | 7/2012 | Breeser | B67D 7/04 222/14 |
| 8,240,507 | B2 | * | 8/2012 | Breeser | B67D 7/425 222/22 |
| 8,603,257 | B2 | * | 12/2013 | Burt | E03D 9/032 4/231 |
| 9,481,000 | B2 | * | 11/2016 | Wrobel | E04F 21/12 |
| 10,220,229 | B2 | * | 3/2019 | McLoughlin | A62C 31/24 |
| D850,505 | S | * | 6/2019 | Bloom | D15/150 |
| 11,078,069 | B2 | * | 8/2021 | Bloom | B67D 7/54 |
| 11,358,853 | B2 | * | 6/2022 | Wells | B67D 1/08 |
| 2005/0095723 | A1 | * | 5/2005 | DiTrolio | B01L 3/0213 422/522 |
| 2007/0186335 | A1 | * | 8/2007 | Alexander | E03D 9/007 4/225.1 |

FOREIGN PATENT DOCUMENTS

| | | |
|---|---|---|
| DE | 60221303 T2 | 4/2008 |
| DE | 102015220336 A1 | 4/2017 |
| GB | 2371539 A | 7/2002 |
| WO | 2012126963 A2 | 9/2012 |

* cited by examiner

DOSING DEVICE FOR DISPENSING A PREDETERMINED AMOUNT OF LIQUID, IN PARTICULAR A PREDETERMINED AMOUNT OF WATER

CROSS-REFERENCE TO RELATED APPLICATION

This application claims the priority, under 35 U.S.C. § 119, of German patent application DE 10 2019 109 009, filed Apr. 5, 2019; the prior application is herewith incorporated by reference in its entirety.

BACKGROUND OF THE INVENTION

Field of the Invention

The invention relates to a dosing device for dispensing a predetermined amount of liquid, in particular a predetermined amount of water. The invention further relates to a method for dispensing a predetermined amount of liquid by means of such a dosing device and an arrangement of such a dosing device on a container with a container opening.

In particular in the industrial sector, for example in the construction industry, it is often necessary to fill containers or vessels with a precisely specified amount of a liquid, for example with water. The term liquid is to be expressly understood in the present context in a broad sense and relating to any flowable medium which has flow properties.

Filling containers or vessels with an exact amount of liquid usually requires the operator to monitor the filling process precisely, which is time-consuming and labor-intensive.

BRIEF SUMMARY OF THE INVENTION

It is accordingly an object of the invention to provide a dosing device, which overcomes the above-mentioned and other disadvantages of the heretofore-known devices and methods of this general type and with which a predetermined amount of liquid, in particular a predetermined amount of water, can be dispensed in a functionally reliable manner, saving time and labor.

With the above and other objects in view there is provided, in accordance with the invention, a dosing device for dispensing a predetermined amount of liquid, in particular for dispensing and metering an amount of water. The dosing device comprising:

a housing formed with a liquid inlet, a liquid outlet, and a flow channel flow-connecting said liquid inlet and said liquid outlet;

a valve element arranged in a flow path of said flow channel and being adjustable between a closed position and at least one open position to selectively block or unblock the flow path towards said liquid outlet;

a measuring device configured to measure a flow rate of liquid through said flow channel in a direction to said liquid outlet;

an operating unit for actuating the dosing device;

a controller having said operating unit or being coupled to said operating unit for signal transmission, said controller being coupled in terms of control technology to said valve element and to said measuring device, and said controller being configured to hold said valve element in an open position or moving said valve element to an open position when the dosing device is actuated.

In other words, there is provided, in accordance with the invention, a dosing device for dispensing a predetermined amount of liquid, in particular a predetermined amount of water. The device has a housing which has a liquid inlet and a liquid outlet, which are flow-connected by means of a flow channel and thus form part of the flow channel. Furthermore, a valve element is provided in the flow path of the flow channel, which is adjustable between a closed position and at least one open position to block or unblock the flow path to the liquid outlet. Further, the dosing device comprises a measuring device by means of which the flow rate flowing through the flow channel in the direction of the liquid outlet can be measured. In addition, a controller is provided which has an operating unit or is coupled to an operating unit for signal transmission, the dosing device being activatable or actuatable indirectly or directly by means of the operating unit. The operating unit, which can also be referred to as an operating element, can thus be arranged directly on the housing of the dosing device or, if appropriate, can be designed as a component which can be handled separately and which can be connected or coupled to the dosing device for signal transmission in a wire-bound or wireless manner via a communication interface. According to the invention, it is provided that the controller is further coupled in terms of control technology to the valve element and to the measuring device such that the controller holds the valve element in an open position or transfers it to an open position when the dosing device is actuated.

With a dosing device of such structure, a predetermined amount of liquid can be dispensed or dosed in a simple and functionally reliable manner. Such a structure of the dosing device enables, for example, a target value specification, which will be explained in more detail below, in order to be able to dose a precisely coordinated amount of liquid into a vessel or container.

For a particularly ergonomic handling of the dosing device, in particular as a hand-held device, which can be held with one hand, for example, and actuatable or operable in the manner of a remote control for, for example, a TV set, the housing is preferably rod-like and/or I-shaped. Particularly preferred is a structure in which the housing is rod-like and/or I-shaped and broadens towards one of the two longitudinally opposite housing ends, as viewed transversely to the longitudinal direction and/or in the vertical axis direction, preferably connecting rod-like, so that the housing has a narrow grip area and a broadened head area adjoining said narrow grip area and opposite to it, as viewed transversely to the longitudinal direction and/or in the vertical axis direction. Such a particularly preferred housing structure has the advantage that technical components, such as components of the measuring device and/or the valve element or also the components of the controller, which have a certain minimum size for technical reasons, can then be arranged simply and functionally reliably in the broadened head area and the narrow grip area still provides an ergonomic and simple component that can be operated and handled as a dosing device, for example with one hand.

Furthermore, such a structure allows a particularly advantageous subdivision of the housing into a liquid-carrying pressure area on the one hand, which essentially accommodates the flow channel, and a technology or electronics area on the other, which essentially accommodates the technology or electronic components. This is explained in more detail below in connection with further preferred configurations:

According to a preferred specific configuration, which is also particularly appealing in terms of design, the housing, relative to the top view of the housing, is essentially axially symmetrical with a longitudinal axis of symmetry, with respect to its side edges which are opposite to one another in the transverse direction and running in the longitudinal direction. This is preferably done in such a way that the narrow grip area of the housing is delimited by two first side edge areas which run in the longitudinal direction and are spaced apart in the transverse direction opposite to one another and to which, as viewed in the longitudinal direction, a transition area adjoins that extends in each case outwards in the direction away from the axis of symmetry and which broadens the outer contour of the housing in the transverse direction. Furthermore, the respective transition areas are in turn adjoined by a second side edge area running in the longitudinal direction, wherein the second side edge areas form the head area that is broadened in the transverse direction with respect to the narrow handle area and are positioned at a greater distance to the axis of symmetry compared to the first side edge areas.

A particularly high-quality ergonomic configuration of high-quality design also results when the first side edge areas, as viewed in the longitudinal direction, run essentially parallel to one another and/or in a straight line and are connected at a housing end opposite the broadened head area to a transverse, straight or curved handle area transverse edge. Alternatively or additionally, the transition areas can be curved outwardly away from the axis of symmetry, in particular S-shaped, in order to create a smooth, rounded transition between the first and second side edge areas. Furthermore, alternatively or additionally, the second side edge areas can be curved in the direction of the axis of symmetry and be connected at the end to a straight or curved head area transverse edge running in the transverse direction. This results in a particularly easy to manufacture configuration of the broadened head area of high-quality design.

Basically, there are many ways to manufacture such a housing. A particularly simple and inexpensive manufacture of a housing is obtained when the housing enclosing a cavity as a receiving space is formed with two shells with a housing parting plane that is essentially horizontal relative to the vertical axis direction, so that the two-part housing relative to the vertical axis direction has an upper, preferably trough-shaped, housing shell and/or with the operating unit on its visible or outer side, and a lower, preferably trough-shaped, housing shell which are connected to one another in the assembled state, preferably detachably connected to one another. In the present context, the terms upper and lower always refer to a vertical axis direction in which the upper housing shell is above the lower housing shell in the vertical axis direction. The upper housing shell is also characterized, for example, in that it has the operating unit on its visible or outer side, the operating panel of which has, for example, buttons and/or a display and/or a viewing window for a display. However, this is in no way to be understood as restricting or limiting, and here expressly serves only for better comprehensibility. Of course, the terms "upper" and "lower" can therefore also be interchanged.

According to a further particularly preferred configuration, the liquid inlet is arranged on the face of one of the two longitudinally opposite housing ends, so that the flow channel can extend starting from the liquid inlet in the longitudinal direction of the housing to approximately the area of the longitudinally opposite housing end and there opens into a preferably lower bottom wall of the housing relative to the vertical axis direction, wherein the mouth opening forms the liquid outlet or is part of the liquid outlet. With such an arrangement of the liquid inlet on the face, the desired, elongated and rod-shaped housing configuration of the dosing device can still be maintained unchanged, in particular with regard to compact one-hand operation, since the liquid inlet then simply essentially extends in a straight line from a supply line for the liquid connected there.

Alternatively or additionally, in particular in connection with a housing which has the previously described narrow handle area and broadened head area, it can be provided that the liquid inlet is arranged on the narrow handle area, in particular arranged on the face of the housing end opposite the broadened head area, so that the flow channel then preferably extends starting from the liquid inlet in the longitudinal direction of the housing to the broadened head area and opens there, preferably in a bottom wall of the housing relative to the vertical axis direction, the mouth opening forming the liquid outlet or being part of the liquid outlet.

The bottom wall-side mouth of the liquid outlet provided as a preferred variant in the two embodiments just described has the advantage that the dosing device can then be handled in the manner of a spray head, which is more favorable for many applications, for example when filling containers or vessels, than a "garden hose-like" arrangement of the liquid outlet on one end of the housing, although this can, of course, also be provided for those applications where this should be necessary or should be desired.

According to a further particularly preferred configuration, it is provided that the flow channel, preferably on the bottom wall side, runs in the lower housing shell and is formed in several parts, at least in areas, with a first wall section that is open at the top towards the housing shell which can be closed to form a closed flow path with a removable, cover-like second wall section, in particular can be closed tightly. The cover-like second wall section is preferably designed as a technology cover on which at least part of the measuring device and/or at least part of the valve element can be supported and/or arranged in such a way that at least part of the measuring device and/or the valve element are arranged in the flow path. Such a structure results in a particularly functionally integrated solution, which also has a very compact construction, since the technical components to be provided in connection with the dosing device can be arranged in a very small space.

Such a structure with a technology cover in connection with a housing configuration is particularly preferred which, as described above, has a narrow handle area and a head area adjoining the narrow handle area and broadened relative to it, since this broadened head area has sufficient space for the arrangement of such a technology cover. Accordingly, according to this particularly preferred embodiment, it is provided that the flow channel, preferably on the bottom wall side, runs and is arranged in the lower housing shell and has a first flow channel section in the narrow grip area, which is adjoined by a second flow channel section extending into the broadened head area and which is formed in several parts at least in the broadened head area, preferably approximately from the transition area to the broadened head area, and has a first or lower wall section that is open upwardly towards the upper housing shell and which can be closed to form a closed flow path with a removable, cover-like, second or upper wall section of the second flow channel section, in particular can be closed tightly. The cover-like upper wall section is designed as a technology cover on which at least part of the measuring device and/or at least part of the valve element can be supported and/or arranged in such a way that at least part of the measuring device and/or the valve element is arranged in the flow path of the second flow channel section.

For sealing purposes, a sealing element is preferably provided between the mutually associated or adjacent edge sections of the technology cover and the first lower wall section, preferably an annular or annular circumferential sealing element. Furthermore, a crossbar is preferably provided within the annular sealing element, which serves to reliably seal the technology cover, in particular in the U-shaped flow deflection area, which will be described in more detail below.

The measuring device is preferably arranged before and thus upstream of the valve element, as viewed in the flow direction of the liquid, but could also be arranged downstream of the valve element if necessary.

For a particularly simple manufacture and functionally integrated solution, it is also provided that the liquid inlet is preferably arranged on the housing shell in which the flow channel runs. That is, in connection with the above-described specific solution, in which the flow channel runs in the lower housing shell, the liquid inlet is also arranged on the lower housing shell.

The measuring device is preferably designed as an impeller flow meter, which is characterized by a compact design with a high level of functional reliability and can therefore be easily integrated into a compact and small-sized housing. This impeller flow meter has a rotatably mounted impeller arranged in the flow channel and a sensor which interacts with the impeller and senses the rotary movement of the impeller and transmits it as a signal to a control and evaluation electronics of the controller. A configuration is particularly preferred in which the impeller is rotatably supported on the technology cover and is arranged in the flow channel, for example in the second flow channel section. The sensor is formed by a, preferably magnetic field-controlled, pulse generator arranged in the housing, which converts the rotary movement of the impeller into a flow-proportional signal and supplies it to the control and evaluation electronics.

According to a further particularly preferred embodiment, it is provided that the first flow channel section running in the narrow grip area is essentially planar on its upper side, as viewed in the vertical axis direction, and/or forms a support for a battery holder, in which at least one battery is accommodated, which for energy supply is directly or indirectly coupled to the controller and/or to the operating unit and/or to the valve element and/or to the measuring device. The first flow channel section running in the narrow handle area thus has here a dual function forming at the same time a support for a battery holder which also contributes to the fact that the narrow handle area can be formed generally very compact.

In connection with the battery holder, a structure is preferred in which the battery holder extends into the area of the impeller, preferably rests above the impeller on the technology cover and/or is supported on the technology cover. In such an embodiment, the sensor can be arranged very well on the battery holder and associated with the impeller, which also contributes to achieving a compact structure of the housing which is not very component-intensive, overall.

Further, it is advantageous if a control circuit board of the controller is arranged in the housing, preferably in the upper housing shell, the control circuit board having a control and evaluation electronics coupled with the operating unit and/or with the measuring device and/or with the valve element for signal transmission, and/or a display which, in the assembled state, is associated with a housing recess in the visible or outer side as the upper side of the housing. Such a control circuit board is relatively small and can therefore contribute to the overall compact construction of the dosing device, very well.

The control circuit board is preferably detachably mounted on the inside of the upper housing shell by means of a plug connection. For this purpose, it is preferably provided that the control circuit board has at least one, preferably a plurality of plug-in openings, by means of which the control circuit board is pushed onto correspondingly assigned plug-in pins in the upper housing shell. To secure the plug-in connection, a locking washer can be provided, which is plugged onto the plug-in pins and fixes and holds the control circuit board in a precise position.

According to another particularly preferred specific configuration, the broadened head area can protrude beyond the narrow handle area in the vertical axis direction at the bottom and thus the second flow channel section running in the housing on the bottom wall side can be offset downwards in the vertical axis direction compared to the first flow channel section likewise running in the housing on the bottom wall side. As a result, a free space is formed in the area above the technology cover, which is available for the arrangement of further technical components, so that the housing is essentially smooth and/or planar on its visible and outer or upper side, relative to the vertical axis direction, which helps to create an overall very high-quality impression without forming protrusions, edges or corners on the visible side. It is particularly preferred in the context of the solution according to the invention if the control circuit board is arranged and accommodated in this free space.

The technology cover itself can, for example, be integrally connected to one of the two housing shells and then, when the two housing shells are assembled, also be simultaneously connected tightly to the associated open wall section of the flow channel. Such a solution is, however, relatively complex in terms of production technology, so that, according to a particularly preferred configuration, the technology cover is formed by a separate component which can preferably be detachably connected to the associated wall section. According to a particularly preferred configuration in this regard, the technology cover is detachably, preferably by means of several screw connections, fixed in or inside the lower housing shell. It can preferably be provided that the screw connections on the outer periphery of the technology cover have a plurality of spaced apart support and screw-through domes, which are associated with screw-in domes that are arranged in the lower housing shell such that the screw-in domes and the support and screw-through domes in the assembled state of the technology cover, are essentially aligned one above the other, as viewed in the screwing direction, and a connecting screw of the screw connection, with support on the support and screw-through dome, is screwed through it into the screw-in dome and the support and screw-through dome is thus braced with the screw-in dome. As a result, the technology cover can also be connected to the associated, preferably lower, wall section in a particularly simple manner.

Especially preferred is further a specific configuration in which the area of the second flow channel section formed by the technology cover and the lower wall section has an essentially U-shaped flow deflection area, which is designed such that the liquid flowing in the deflection area from the lower wall section, initially flows in a first section of the flow deflection area upwardly or in the direction of the technology cover to an overflow area formed in the technology cover, in which the flow deflection takes place before the liquid—and subsequently, after flowing through the overflow area, in a second section of the flow deflection area, relative to the vertical axis direction-flows downwardly or away from the technology cover to the liquid outlet arranged and/or formed in the bottom wall of the lower housing shell. In this embodiment variant it is preferably provided that the valve element is supported at the technology cover, preferably in a tubular holder at the upper side of the technology cover, relative to the vertical axis direction, and/or integrated in the flow path in such a way that the valve element, preferably a closure part of the valve element, blocks the flow path, preferably the overflow area, in the closed position and unblocks it in an open position. With such an embodiment variant, it is possible to build in a particularly space-saving and compact manner, because the valve element can thereby be arranged in a space-saving manner on the top of the technology cover and only protrude into the flow path or be integrated into the flow path in such a way that the overflow area can be blocked and opened. In particular, such a design variant enables the horizontal installation of a valve element, so that, overall, only a small amount of space and installation space is required for the arrangement of the technical components. The term of overflow area is to be broadly interpreted and understood. Thus, the overflow area according to a first exemplary variant, for example, can be formed by a technology cover-side overflow opening which is closed by a displacement of a closure part of the valve element. Alternatively, the overflow area can have a flow-through area of the valve element that is located in the flow path, which flow-through area can be blocked or opened with a closure part of the valve element, for example by means of a diaphragm assembly. These are just two examples that should clarify that the technology cover-side overflow area can be designed in a wide variety of ways.

With regard to the upper and lower housing shells, a structure is preferred in which the, preferably trough-shaped, upper housing shell and the, preferably trough-shaped, lower housing shell each have annular circumferential peripheral areas which are associated with one another and which adjoin one another in the assembled state, preferably tightly adjoin one another with an intermediate connection of an annular circumferential sealing element. With such mutually associated, annularly circumferential peripheral areas, a particularly simple and reliable arrangement, sealing and connection possibility for the two housing shells results.

For example, for a particularly preferred connection solution, a plurality of screw-in domes spaced apart in the circumferential direction can be provided on one of the two housing shells on the outer circumference which are associated with support and screw-through domes on the other housing shell which are likewise arranged on the outer circumference. This is preferably done in such a way that the screw-in domes and the support and screw-through domes, in the assembled state of the housing, are essentially aligned one above the other, as viewed in the screwing direction, and a connecting screw, with support on the support and screw-through dome, is passed through it and the screw-in dome, and is secured at the end with a screw nut supportable on the screw-in dome in such a way that the support and screw-through dome is braced with the screw-in dome. In this solution, the screw-in dome is actually also a screw-through dome through which the connecting screw is inserted or passed. A solution without screw nut, in which the connecting screw is screwed directly into the screw-in dome having a nut thread, is always conceivable and possible. This results in a particularly reliable and operationally safe fixing of the two housing shells to one another.

The annular sealing element is preferably designed in such a way that it has recesses spaced apart from one another in the circumferential direction, through which, in the assembled state, pin-like protrusions of the upper housing shell and/or the lower housing shell arranged on the inside and/or on the edge engage, it being preferably provided that the recesses surround the pin-like protrusions in shape and contour. This allows a particularly precise positioning of the sealing element, so that incorrect installation of the sealing elements is excluded. A special functionally integrated solution is obtained if at least some of the pin-like protrusions (preferably all pin-like protrusions) are formed by the screw-in domes and/or the support and screw-through domes themselves.

For a particularly preferred connection of the two housing shells, it is proposed that two pairs of domes of support and screw-through dome and screw-through or screw-in dome are provided on each of the two housing ends which are opposite in the longitudinal direction on the, in the transverse direction, opposite corner areas of these housing ends. At the same time, a pair of domes consisting of a support and screw-through dome and a screw-through or screw-in dome are provided on the two, in the transverse direction, opposite transition areas between the narrow grip area and the broadened head area. Such an arrangement of pairs of domes also results in an overall high-quality overall design impression.

With regard to the previously mentioned battery holder, it is further particularly advantageous if the battery holder together with the at least one battery accommodated therein extends in the longitudinal direction, in particular in the case of a plurality of batteries, these are accommodated one behind the other in the battery compartment in the longitudinal direction, because this enables an overall elongated and narrow housing configuration. For easy access to the battery compartment, it is provided, for example, that a removable battery compartment cover is arranged in the area above the battery compartment in the upper housing shell.

The battery holder preferably has an elongated support plate which is detachably held on the flow channel by means of at least one plug connection. For this purpose, it is preferably provided that the support plate of the battery holder has a respective plug opening at the opposite ends, by means of which the battery holder is plugged in plug-in pins of the flow channel, e.g. can be plugged in plug-in pins arranged in the area of the technology cover and in the area of the first flow channel section or the housing end. To secure the plug-in connection, a locking washer can be provided which is plugged onto the plug-in pins and secures and fixes the carrier plate in the desired position, for example holding it in a bearing connection on the flow channel.

A particularly compact structure also results if the first flow channel section of the flow channel in the lower housing shell runs between side walls of the lower housing shell spaced apart transversely to the longitudinal direction, at least one fastening screw being provided for detachably fastening the battery compartment cover, which screw preferably can be screwed into one battery compartment screw dome arranged in the upper housing shell. According to a further particularly preferred embodiment of the invention, a holding bracket is formed and/or arranged on the housing, preferably adjacent to a liquid outlet and/or on the bottom of the housing relative to the vertical axis direction, in particular for holding and/or supporting the dosing device at an opening edge area of a container or vessel opening of a container or vessel to be filled. Such a holding bracket ensures that the dosing device does not have to be held by the operator during the dosing process, but can, for example, simply be arranged at the opening edge area of the container or vessel. The holding bracket can be formed by a separate component that is connected to the housing. As an alternative to this, the holding bracket can also be formed integrally with the housing, in particular can be connected to the housing in the same material and/or integrally.

In this context, it is particularly advantageous if the dosing device rests on the opening edge area in the state held by means of the holding bracket on an opening edge area of a container or vessel opening of a container or vessel to be filled, in such a way that the liquid outlet points in the direction of the container or container interior and/or the operating unit is freely accessible for actuation, in particular is freely accessible from above relative to the vertical axis direction.

According to a particularly advantageous embodiment variant, the holding bracket is designed and arranged on the dosing device in such a way that the dosing device resting on the opening edge area, with its partial area being outside the container or vessel, can be tipped down and supported on the outer wall of the container or vessel with a supporting area of the holding bracket. This can be achieved, for example, by the fact that the center of gravity of the dosing device (or the dosing device with connecting parts) is outside the container or vessel in its state resting on and held at the opening edge area. In order to prevent the dosing device from slipping off in the case of this tiltable variant, in which the holding bracket is supported at a support area on the outer wall of the container or vessel, a counter bearing is provided on the housing of the dosing device, which, when the dosing device is in the tilted, held state, bears against the opening edge area from the inside of the container or vessel and is supported there. The counter bearing can, in principle, be designed in different ways, for example by a protrusion on the housing side or by a nib on the housing side, to name just two examples. For a particularly advantageous and functionally integrated solution, in which components are used in a double function, it can be provided that the liquid outlet has an outlet element protruding from the housing, preferably a tubular outlet connector, which forms the counter bearing.

The holding bracket itself preferably has a holding bracket area which protrudes from the housing, preferably from the bottom of the housing, of the dosing device. In particular, this holding bracket area is suitable for forming the supporting area of the holding bracket.

According to a specific configuration, the holding bracket area protruding from the housing, preferably from the bottom of the housing, can be L-shaped and have a first leg that protrudes from the housing, preferably from the bottom of the housing, and a second L-leg, which protrudes from the free end area of the first L-leg in the direction of the liquid outlet side and/or in the direction of the container or vessel outer wall. In particular, with such a geometry that is easy to produce, there is a particularly advantageous support of the dosing device in the held position of the dosing device.

The protruding holding bracket area can protrude at an angle from the housing, preferably from the bottom of the housing, and can be tilted in the direction of the liquid outlet side and/or in the direction of the outer wall of the container or vessel. This angular arrangement in the direction of the liquid outlet side or in the direction of the container or vessel outer wall provides, at the same time, an overall compact and small structure.

The holding bracket can furthermore have a mounting bracket area which is arranged on the housing, preferably on the bottom of the housing, preferably in the area of the liquid outlet, and which is preferably detachably fixed, to which the holding bracket area adjoins. With such a mounting bracket area there is a simple possibility of fixing the bracket to the housing. As an alternative, the holding bracket can also, as already stated above, be formed integrally with the housing, in particular be connected to the same material and/or integrally with it.

According to a further particularly preferred embodiment, it is provided that the holding bracket area protruding from the housing, preferably from the bottom of the housing, is spaced apart from the liquid outlet, as viewed in the longitudinal direction of the housing, preferably closer to the narrow handle area than the liquid outlet that is arranged at the bottom of the broadened head area, preferably approximately centrally. This results in particularly favorable conditions for a tilted support of the dosing device, as has already been explained in detail above.

The mounting bracket area can be arranged particularly advantageously on the broadened head area on the bottom of the housing, wherein it is preferably provided that the mounting bracket area is plate-shaped with an outer contour essentially corresponding to the bottom of the broadened head area and has a recess for the liquid outlet. With a structure of this type, the mounting bracket area matches the contour of the broadened head area and thus blends excellently with the design of the overall construction of the dosing device.

Basically, the holding bracket can be made in several parts from different components that are connected to each other. However, an embodiment in which the holding bracket is formed integrally and of one material, for example from a metal or a plastic, is particularly advantageous. For example, the holding bracket can then be formed as a sheet metal bent component or else from a molded plastic part.

The holding bracket or the holding bracket and its components can, in principle, be formed in a particularly simple manner by a wire. For a more planar support, however, the holding bracket or the holding bracket and its components, based on the extent in the transverse direction, are planar and plate-shaped, for example bent as a sheet metal bent component from a sheet metal plate.

The liquid outlet can be designed in different ways. Particularly preferably, this liquid outlet has a connection element, in particular a coupling element for a fluid line. The connection element can preferably be arranged with the interposition of a sealing element. In particular in connection with such a connection element, it can be provided that the connection element forms the outlet element protruding from the housing and thus the counter bearing.

Correspondingly, a connection element, in particular a coupling element, for a liquid line can also be arranged on the liquid inlet, preferably arranged with the interposition of a sealing element.

Furthermore, a sieve can be arranged in the area of the liquid inlet, in particular, to be able to filter out any impurities early in a functionally reliable manner.

Furthermore, the operating unit of the controller can have an operating panel arranged on a visible or outer side of the housing, in particular on the visible or outer side of the upper housing shell, with at least one button and/or with at least one display and/or with at least one viewing window for a display.

The operating unit itself can have a start button, the actuation of which causes the controller to start a dosing process, in particular with or without a target value specification. An operating unit is particularly advantageous, however, in which, preferably via at least one input button of the operation unit, a target value for an amount of liquid to be dispensed can be specified and/or set, wherein the controller closes the valve element automatically as soon as an actual value sensed by means of the measuring device of the amount of liquid flowing through the flow channel corresponds to the target value specified and/or set by the operating unit. Particularly in connection with such a target value specification, there is a significant simplification for the operator, who does not have to monitor the filling process separately each time.

Furthermore, the controller can have a memory function, by means of which at least one target value can be stored via at least one memory button on the operating unit. This is particularly advantageous for repetitive filling processes.

Furthermore, the operating unit can have an input button, the actuation of which does not result in a target value specification, so that when the start button is actuated, the dosing device dispenses liquid until the liquid supply is stopped, preferably by actuating the start button again or by actuating a stop button. In this context it can be provided that the amount of liquid dispensed in this operating mode can be shown on a display.

The invention further relates to an arrangement of a dosing device at an opening edge area of a container with a container opening.

Furthermore, the invention relates to a method for dispensing a predetermined amount of liquid, in particular a predetermined amount of water, with a dosing device according to the invention.

Other features which are considered as characteristic for the invention are set forth in the appended claims.

The advantageous configurations and developments of the invention explained above and/or presented in the dependent claims can be used individually or in any combination, apart from, for example, in the case of clear dependencies or incompatible alternatives. Further, although the invention is illustrated and described herein as embodied in dosing device for dispensing a predetermined amount of liquid, in particular a predetermined amount of water, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
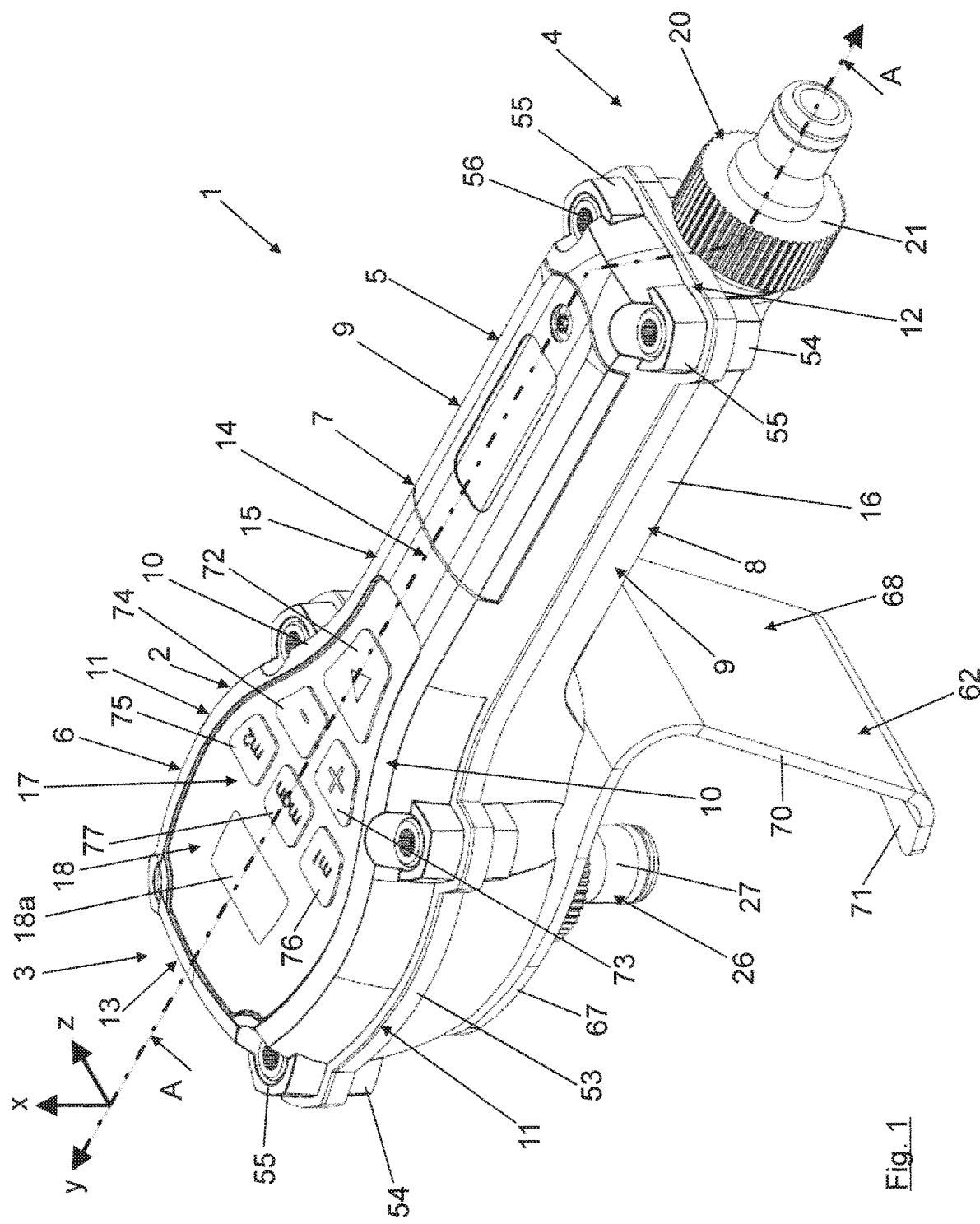
FIG. 1 shows a schematic, perspective top view of an exemplary embodiment of a dosing device according to the invention.
Figure 2:
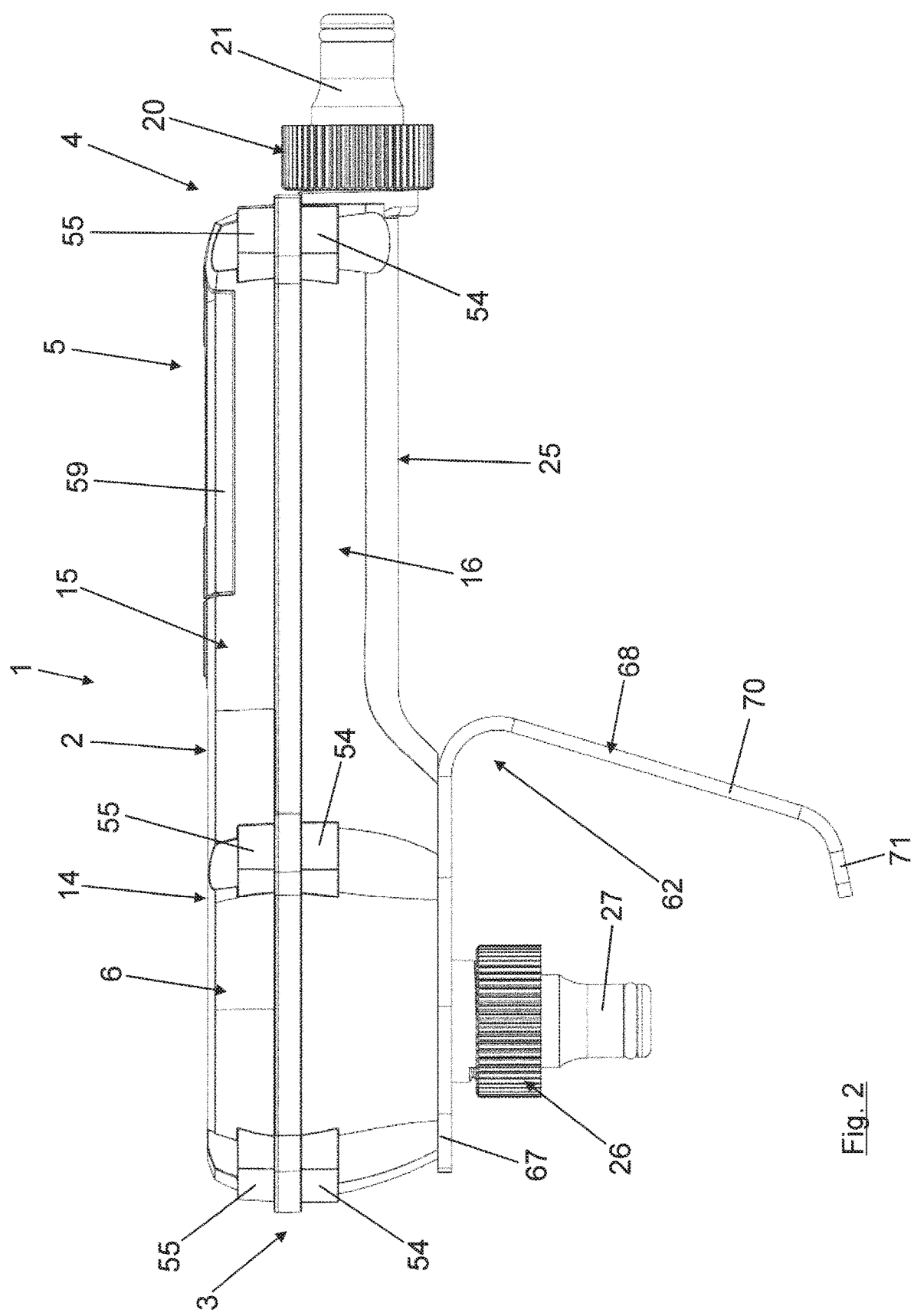
FIG. 2 shows a side view of the embodiment of FIG. 1.

Referring now to the figures of the drawing in detail and first, particularly, to FIGS. FIGS. 1 and 2, there is shown a perspective top view and a side view of an exemplary embodiment of a dosing device 1 according to the invention for dispensing a predetermined amount of liquid, for example a predetermined amount of water.

The dosing device comprises a housing 2, which is rod-like or I-shaped and broadens towards one of the two housing ends opposite in the longitudinal direction, here as viewed in particular transversely to the longitudinal direction y and also in the vertical axis direction x, broadens in particular like a connecting rod. As a result, the housing 2 has a narrow grip area 5 and a head area 6 which adjoins narrow grip area 5 and is broadened in relation thereto. As can be seen in particular from FIG. 1 in conjunction with FIG. 2, the head area here broadens both in the vertical axis direction x and in the transverse direction z compared to narrow grip area 5, but this is only to be understood as an example. In principle, only widening in the vertical axis direction x or in the transverse direction z would be possible also.

As can be seen in particular from FIG. 1, housing 2, relative to the top view of housing 2, is substantially axially symmetrical with a longitudinal axis of symmetry with respect to its side edges 7, 8 which are opposite to one another in the transverse direction and running in the longitudinal direction y, which axis of symmetry is schematically formed by section line AA in the illustration of FIG. 1.

As can be seen from FIG. 1, narrow grip area 5 of housing 2 is delimited by two opposite first side edge areas 9 which run in the longitudinal direction y and are spaced apart from one another in the transverse direction z, and to which, as viewed in the longitudinal direction y, a transition area 10 adjoins that extends in each case outwards in the direction away from the axis of symmetry and which broadens the outer contour of the housing in the transverse direction z.

These transition areas 10 are in turn adjoined by a second side edge area 11 running in the longitudinal direction, wherein the second side edge areas 11 form the head area 6 that is broadened in transverse direction z with respect to the narrow handle area 5 and are positioned at a greater distance to the axis of symmetry compared to the first side edge areas 11.

As can be further gathered from FIG. 1, first side edge areas 9, as viewed in the longitudinal direction y, run essentially parallel to one another and/or in a straight line and are connected at a housing end 4 opposite broadened head area 6 to a transverse direction z, in this case straight (optionally also curved) handle area transverse edge 12.

Here, transition areas 10 are curved outwardly away from the axis of symmetry, in particular S-shaped curved, whereas the second side edge areas 11 are curved in the direction of the axis of symmetry and are connected at the end to a, in this case, more or less straight (optionally also curved) head area transverse edge 13 running in the transverse direction z. Both handle area transverse edge 12 and head area transverse edge 13 are drawn running essentially straight here in the representation in FIG. 1, could, however, also have a curvature as described.

Figure 3:
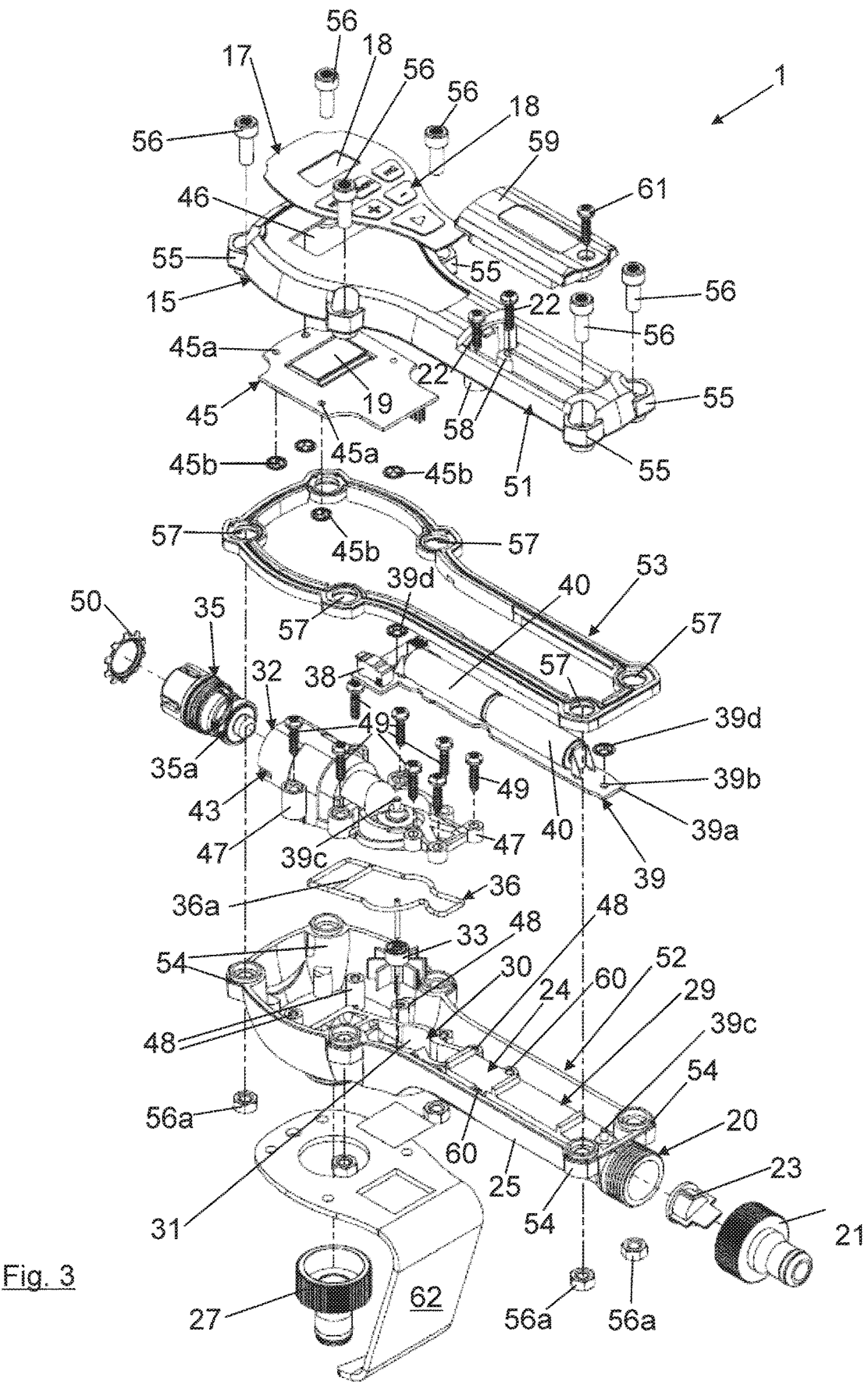
FIG. 3 shows a schematic and perspective exploded view of the structure and the components of the dosing device according to FIG. 1.
Figure 4:
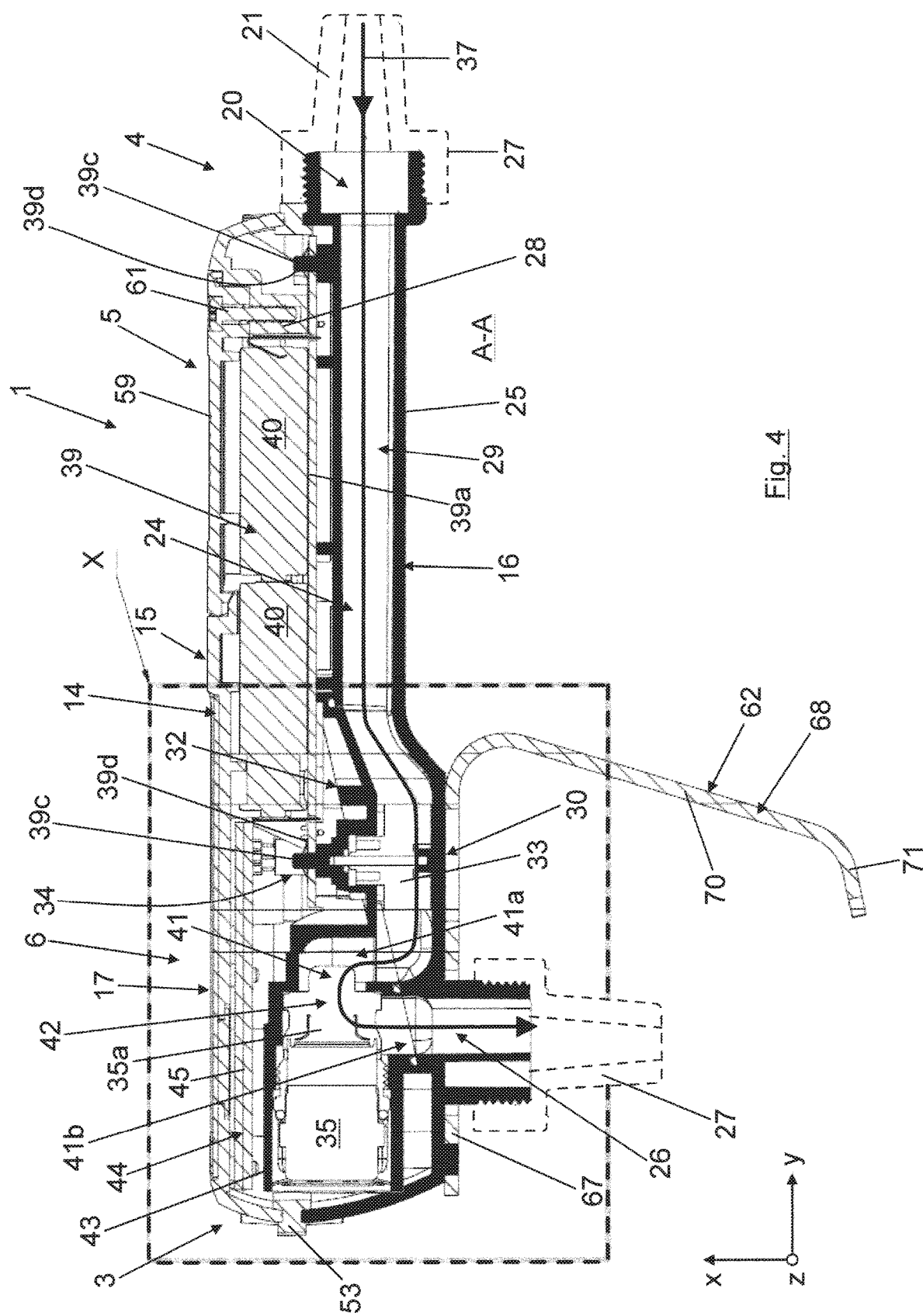
FIG. 4 shows a section along the line A-A of FIG. 1, wherein the entire flow channel is colored black for reasons of clarity.

As can also be seen in particular from FIGS. 3 and 4, housing 2—enclosing a cavity as a receiving space—is formed with two shells with a housing parting plane that is essentially horizontal relative to the vertical axis direction x, wherein the two-part housing has an upper, trough-shaped housing shell 15 provided with the operating unit 17 on its visible or outer side 14 and a lower, trough-shaped housing shell 16, which are connected to one another in the assembled state, namely, as will be explained in detail below, detachably connected to one another.

Operating unit 17, which can also be referred to as an operating element, as component of the controller is coupled with it for signal transmission so that dosing device 1 is actuatable by means of operating unit 17. To this end the, preferably film-like operating unit 17 has an operating panel 18 with a plurality of buttons and a viewing window 18*a* for a display 19 of a later-described control circuit board 45, arranged on visible and outer side 14 of upper housing shell 15. Operating panel 18 is in this case preferably flushly integrated in top-forming visible and outer side 14. The actuation or activation of the dosing device in connection with operating unit 17 and operating panel 18 will be discussed in more detail below.

As can be seen more particularly from FIGS. 3 and 4, dosing device 1 further comprises a housing-side liquid inlet 20, which here is arranged at the end face of housing end 4 of narrow handle area 5 on bottom housing shell 16.

Furthermore, at liquid inlet 20, a connection element 21 or coupling element is arranged for a fluid line (not shown) via an intermediary sealing element (not shown) and/or a sieve 23.

Starting from this liquid inlet 20, a flow channel 24 extends in the longitudinal direction y of housing 2 on the bottom wall side in lower housing shell 16 to broadened head area 6 and opens there, here, for example, approximately in the middle and centrally, in bottom wall 25 of lower housing shell 26, which forms a lower bottom wall of housing 2. The mouth opening is here a component of a liquid outlet 26, which further has an outlet element 27 protruding from the bottom of housing 2 or lower housing shell 16, which here also is, only as an example, formed as a connecting element or coupling element for a liquid line. Here, too, optionally a sealing element can be provided.

Figure 5:
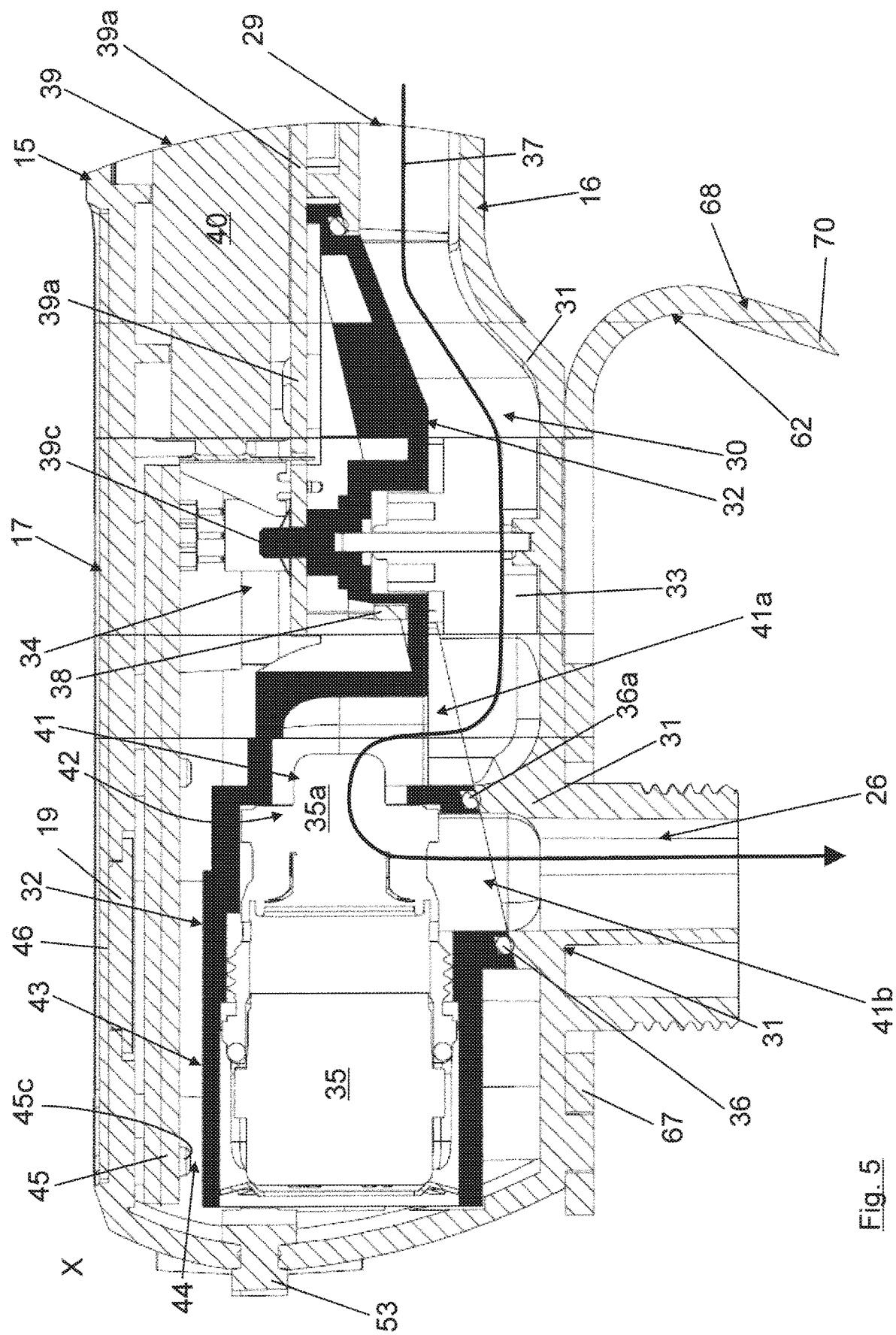
FIG. 5 shows an enlarged representation of the detail X from FIG. 4, only the technology cover of the flow channel being colored black for reasons of clarity.

As can be seen in particular from FIG. 5, which shows an enlarged detailed view X of FIG. 4, flow channel 24 runs here in the lower housing shell 16 on the bottom wall side and has a first flow channel section 29 in narrow grip area 5, adjoined by a second flow channel section 30 extending into broadened head area 6, which second flow channel section 30 here is designed in several parts, for example, approximately from the transition area to the broadened head area 6 or shortly before, and has a first, lower wall section 31 which is open towards the top of upper housing shell 15 and can be tightly closed for formation of a closed flow channel or flow path with a removable, cover-like upper wall section of second flow channel section 30. This cover-like upper wall section is formed here as a technology cover 32.

At this technology cover 32, an impeller 33 of a measuring device formed as an impeller flow meter 34 and a valve element 35 are supported and arranged in such a manner that impeller 33 or a closure part 36 of the valve element are arranged in the flow path of flow channel 24. The flow path of the liquid is shown in FIG. 4 by flow arrow 37.

As already stated above, measuring device 34 is exemplified here as a impeller flow meter and has an impeller 33 which is arranged in flow channel 24 and supported rotatably at technology cover 32, and sensor 38 interacting with impeller 33 which sensor senses the rotational movement of impeller 33 and transmits it as a signal to a control and evaluation electronics of the controller.

As can be seen in particular from FIG. 5, measuring device 34 is arranged upstream of valve element 35, as viewed in the liquid flow direction, in second flow channel section 30 of broadened head area 6.

Sensor 38 can be formed here, for example, by a magnetic field-controlled pulse generator, which converts the rotary movement into a signal proportional to the flow and supplies it to the control and evaluation electronics of the controller.

As can be seen in particular from FIG. 4, first flow channel section 29, which runs in narrow grip area 5, is essentially planar or straight on its upper side, as viewed in the vertical axis direction x, and forms a support for a battery holder 39, of which, here as an example, two batteries 40, as viewed in the longitudinal direction, are accommodated one behind the other, which are directly or indirectly coupled to the controller, operating unit 17, valve element 35 and measuring device 34 for energy supply.

As can be seen from FIG. 4, battery holder 39 extends into the area of impeller 33 and is, which in turn can be seen particularly well from FIG. 5, supported above impeller 33 on technology cover 32, in which case, here, sensor 38 is arranged at this battery holder 39 and is thus associated with impeller 33.

The area of second flow channel section 30 formed by technology cover 32 and lower wall section 31 has an essentially U-shaped flow deflection area 41 which is formed in such a way (FIG. 5), that the liquid flowing from the lower wall section into deflection area 41 initially flows in a first section 41*a* of flow deflection area 41 upwardly or in the direction of technology cover 32, as viewed in the vertical axis direction x, to an opening-like overflow area 42 formed in technology cover 32, in which the flow deflection takes place before the liquid subsequently, after flowing through the overflow area 42 in a second section 41*b* of the flow deflection area 41, again relative to the vertical axis direction x, flows downwardly or away from technology cover 32 to the liquid outlet 26 arranged or formed in bottom wall 25 of lower housing shell.

Valve element 35 is here, for example, held in a tubular holder 43 at the top of technology cover 32, as viewed in the vertical axis direction x, in such a way that overflow area 42 has a throughflow area 35*a* of valve element 35 being in the flow path, which can be closed or opened with a closure part, not shown (e. g. a membrane arrangement) of valve element 35.

As can be seen in particular from FIG. 4 in conjunction with FIG. 5, broadened head area 6 protrudes beyond narrow grip area 5, as viewed in the vertical axis direction x, at the bottom and thus second flow channel section 30 running at the bottom wall side in lower housing shell 16 is offset downwardly relative to the first flow channel section 29 likewise running at the bottom wall side in lower housing shell 16, as viewed in the vertical axis direction x. As a result, a free space 44 can be provided in the area above technology cover 32, in which a control circuit board 45 forming the controller or a component of the controller, which in particular can be seen clearly in the exploded view of FIG. 3, is arranged and accommodated.

This control circuit board 45 has the control and evaluation electronics which is coupled to operating unit 17, measuring device 34 and valve element 35 for signal transmission. Furthermore, this control circuit board 45 has display 19, which, in the assembled state (see FIG. 1), is associated with a housing recess 46 in the visible or outer side 14 as the upper side of housing 2, so that display 19 is visible through viewing window 18a of operating panel 18.

As is only schematically seen in FIG. 3, control circuit board 45 can be detachably fixed by means of a plug-in connection, not shown here in all details, to upper housing shell 15. For this purpose, control circuit board 45 has, by way of example only, a plurality of plug-in openings 45a, by means of which control circuit board 45 can be plugged in plug-in pins 45c, not shown in FIG. 3, of upper housing shell 15 (see FIG. 5) and in this plugged-in state can be fixed by means of a locking washer 45b which can be plugged in plug-in pins 45c.

By these measures it is possible to form housing 2 or upper housing shell 15 on visible and outer side 14 essentially smooth or planar. Only on the bottom opposite visible and outer side 14, the above-described protrusion in broadened head area 6 is necessary in order to accommodate the technical components there, in the manner described.

As can be seen in particular from FIG. 3, technology cover 32 is here formed by a separate component and is fixed by means of a plurality of screw connections detachably in lower housing shell 16. The screw connections here have a plurality of support and screw-through domes 47 spaced apart from one another on the outer circumference of technology cover 32, which are associated with screw-in domes 48 arranged in lower housing shell 16 in such a way that screw-in domes 48 and support and screw-through domes 47 in the assembled state are aligned one above the other, and a connecting screw 49 of the screw connection, with support on the support and screw-through dome 47, can be screwed through it into screw-in dome 48, and to brace support and screw-through dome 47 with screw-in dome 48.

As can be seen from FIG. 3, technology cover 32 is fixed here by means of a total of eight screw connections inside lower housing shell 16, four screw connections being provided and arranged on each of the two long sides.

To seal technology cover 32 relative to lower wall section 31, a sealing element 36 is provided, here, which is formed as an essentially annular sealing element 36 that is arranged between the mutually associated or adjacent edge sections of technology cover 32 and lower wall section 31. Furthermore, a crossbar 36a is provided within annular sealing element 36, which serves to reliably seal technology cover 32 in U-shaped flow deflection area 41.

From FIG. 3 it can also be seen clearly that tubular holder 43 is arranged on technology cover 32 in such a way that valve element 35 can simply be pushed in and inserted into technology cover 32 from the open side. Further, for secure brazing and holding valve element 35, a spring or toothed ring 50 is provided.

As can also be seen in particular from FIG. 3, trough-shaped upper housing shell 15 and trough-shaped lower housing shell 16 each have annular circumferential peripheral areas 51, 52 which are associated with one another and which adjoin one another in the assembled state (see FIG. 1), in fact, tightly adjoin one another with an intermediate connection of an annular circumferential sealing element 53.

On lower housing shell 16, a plurality of screw-through or screw-in domes 54 spaced apart from one another in the circumferential direction are provided on the outer circumference which are associated with support and screw-through domes 55, which are likewise arranged on the outer circumference. The association is such that screw-through or screw-in domes 54 and support and screw-through domes 55, in the assembled state (FIG. 1) of housing 2, are essentially aligned one above the other, as viewed in the screwing direction, and a connecting screw 56 is passed—with support on support and screw-through dome 55—through said dome and screw-through or screw-in dome 54 and is secured at the end with a screw nut 56a that can be supported on screw-through or screw-in dome 54 in such a way that support and screw-through dome 55 is braced with screw-through or screw-in dome 54.

As can also be clearly seen from FIG. 3, a total of six such pairings of domes are provided on the outer circumference of housing 2, three of which are arranged axially symmetrically on opposite sides in transverse direction z.

Alternatively, but not shown here, screw-through or screw-in dome 54 could also have an internal thread, and the connecting screw could thus be screwed into the mere screw-in dome. Such a connection technique is optional in the example shown here and is provided as a further connection option between the two housing shells 15 and 16, specifically in connection with the support and screw-through domes 58 provided on and inside upper housing shell 15 in the area of the battery holder, and associated with screw-in domes 60 in lower housing shell 16. The association is such that screw-in domes 60 and support and screw-through domes 58, in the assembled state of housing 2, are essentially aligned one above the other, as viewed in the screwing direction, and a connecting screw 22 that is supported by support and screw-through dome 58 is screwed through the latter and into the respectively associated screw-in dome 60.

It can further be seen from FIG. 3 that annular sealing element 53 has recesses 57 which are spaced apart from one another in the circumferential direction and into which screw-in domes 54 or support and screw-through domes 55 engage in the assembled state.

To this end, it is particularly preferably provided that recesses 57 of sealing element 53 surround the domes forming the pin-like protrusions in shape and contour.

As has already been explained above, battery holder 39 together with batteries 40 accommodated therein extends in the longitudinal direction y of housing 2, a removable battery compartment cover 59 being arranged in the area above battery holder 39 in upper housing shell 15.

Battery holder 39 has an elongated carrier plate 39a which has a plug opening 39b at the opposite ends, respectively, by means of which the battery holder can be plugged in plug-in pins 39c of flow channel 27 in the area of technology cover 32 and in the area of first flow channel section 29 or housing end 4 and can be fixed in this plugged-in state by means of a locking washer 39d which can be plugged onto plug-in pins 39c.

As can be seen further from FIG. 3 in conjunction with FIG. 4, first flow channel section 29 of flow channel 24 in lower housing shell 16 extends between side walls of lower housing shell 16 spaced apart transversely to longitudinal direction y, with a fixing screw 61 being provided for detachably attaching battery compartment cover 59, which fixing screw 61 can be screwed in a battery compartment cover screw dome 28 which is preferably arranged on upper housing shell 15 (see FIG. 4).

Figure 6:
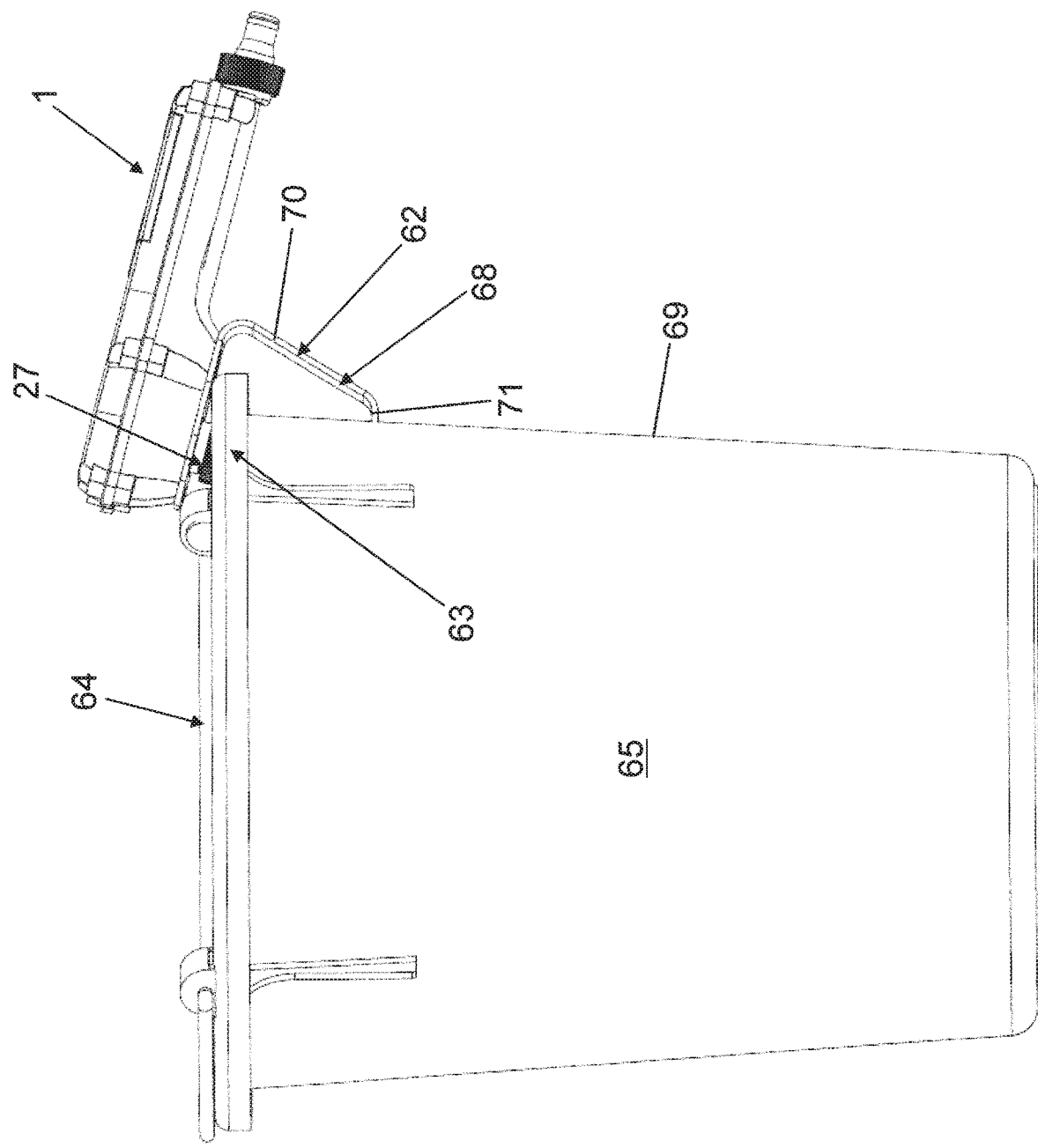
FIG. 6 shows a side view of a dosing device arranged on an opening edge area of a container.
Figure 7:
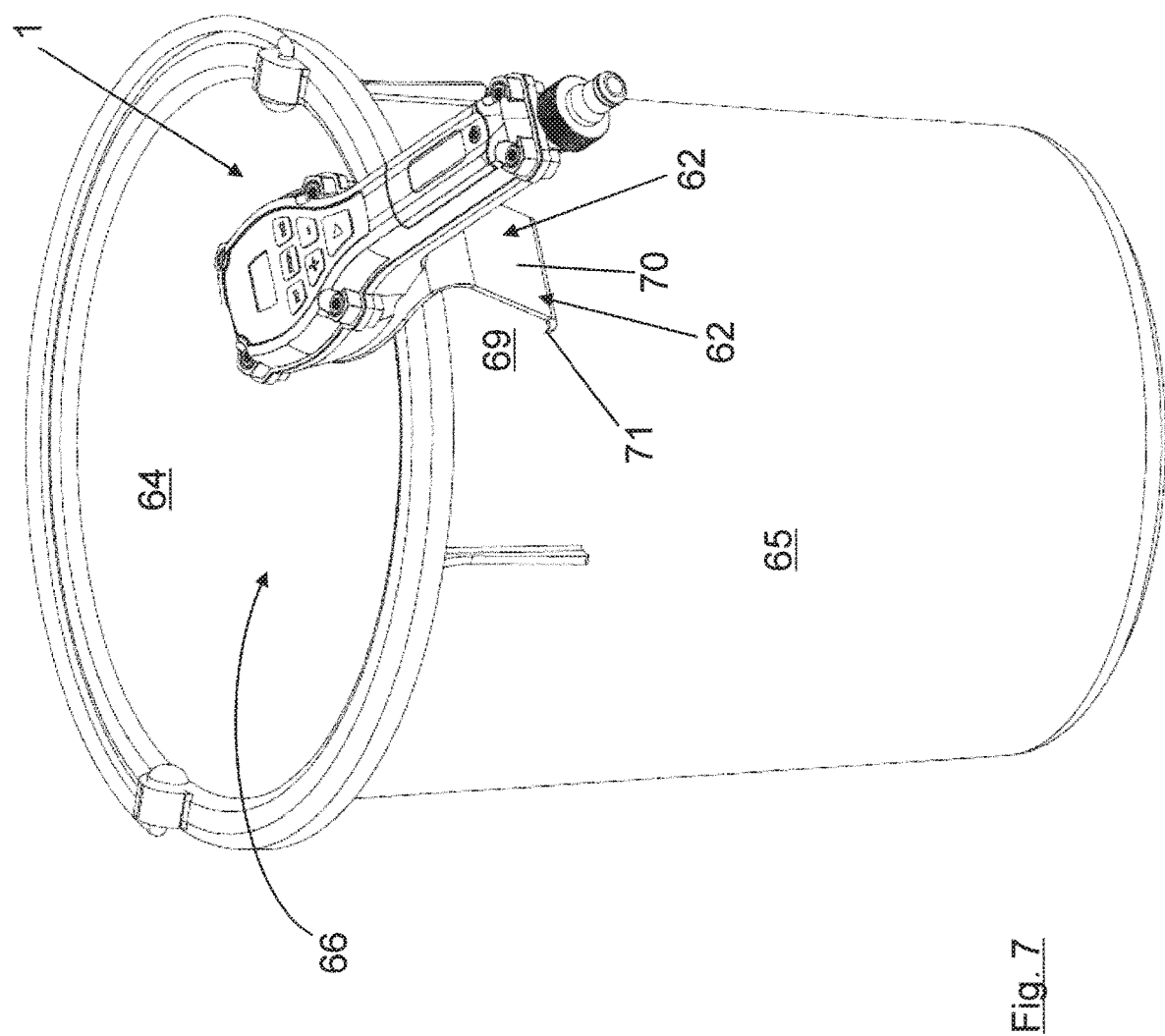
FIG. 7 shows a representation corresponding to FIG. 6 in a perspective top view.

As can also be seen from the figures, a holding bracket 62 is arranged on the bottom of housing 2 or lower housing shell 16 relative to the vertical axis direction x, by means of which dosing device 1 can be held at an opening edge area 63 of a container opening 64 of a container 65 to be filled (see in particular also FIGS. 6 and 7).

As can be seen from the two FIGS. 6 and 7, dosing device 1 rests on opening edge area 63 in the state held by means of holding bracket 62 at opening edge area 63 in such a way that liquid outlet 26 points in the direction of container interior 66 and operating unit 17 is freely accessible from above for actuation.

Holding bracket 62 is formed here, for example, by a plate-shaped sheet metal bent component or molded plastic part which has a mounting bracket area 67 which is arranged in the area of liquid outlet 26 and is preferably detachably fixed there, which is adjoined by an L-shaped holding bracket section protruding from the bottom of housing 2 or lower housing shell 16, which forms a support area 68.

As can be seen in particular from FIGS. 6 and 7, holding bracket 62 is, in this case, formed and arranged on dosing device 1 in such a way that dosing device 1 resting on opening edge area 63, with its partial area being outside container 65, can be tipped down and supported on outer wall 69 of container 65 with the supporting area 68 of the holding bracket. For dosing device 1 to be held in this position, the center of gravity of dosing device 1 or dosing device 1 with any connecting parts, is outside container 65 in its state resting on and held at opening edge area 63.

As can also be seen from FIG. 6, pipe socket-like outlet element 27 of liquid outlet 26 here forms a counter bearing which protrudes from the bottom of housing 2 and, in the tilted, held state of dosing device 1, bears against opening edge area 63 from the inside of the container and is supported there.

Specifically, support area 68 is L-shaped here and has a first L-leg 70 and a second L-leg 71, which protrudes from the free end area of first L-leg 70 in the direction of the liquid outlet side or in the direction of container outside wall 69. The support area protrudes at an angle from the bottom of housing 2 and is inclined in the direction of the liquid outlet side or in the direction of outer wall 69 of container 65.

With regard to its outer contour, mounting bracket area 67 essentially corresponds to the outer contour of broadened head area 6, so that it fits into the overall design.

With such a holding bracket configuration, a secure holding of the dosing device at opening edge area 63 of a container 65 is reliably achieved, even during operation of dosing device 1, so that complicated clampings, springs, brackets, etc. can be refrained from. As can be seen, in the solution according to the invention, dosing device 1 only needs to be placed on opening edge area 63, outlet element 27 placed and supported as a counter bearing on upper opening edge area 63 and then dosing device 1 tipped down outside container 65 until second L-leg 71 of support area 68 of holding bracket 62 bears against outer wall 69 of container 65 and is supported.

As can further be seen in particular from FIGS. 1 to 3, the operating unit 17 or the operating panel 18 has a start button 72 which, when actuated, causes the controller to start a dosing process. A target value for a quantity of liquid to be dispensed can be specified or set via two input buttons 73, 74 of operating unit 17, the controller automatically closing valve element 35 as soon as an actual value of the quantity of liquid flowing through flow channel 24 sensed by means of measuring device 34 corresponds to the target value specified or set by operating unit 17.

The controller can furthermore have a memory function, by means of which target values can be stored via, for example, two memory buttons 75, 76 of operating unit 17.

Operating unit 17 also has, for example, an input button 77, which, when actuated, does not result in a target value specification, so that when the start button is actuated, dosing device 1 dispenses liquid until the liquid supply is stopped. The liquid supply can then be stopped, for example, by pressing the start button 72 or the input button 77 again.

The following is a list of reference numerals used in the above description of the invention with reference to the drawing figures:

1 dosing device
2 housing
3 housing end
4 housing end
5 narrow grip area
6 broadened head area
7 side edge
8 side edge
9 first side edge areas
10 transition areas
11 second side edge areas
12 handle area transverse edge
13 head area transverse edge
14 visible or outer side
15 upper housing shell
16 lower housing shell
17 operating unit
18 operating panel
19 display
20 liquid inlet
21 connecting element
22 connecting screw
23 sieve
24 flow channel
25 bottom wall
26 liquid outlet
27 outlet element
28 battery compartment screw dome
29 first flow channel section
30 second flow channel section
31 first, lower wall section
32 technology cover
33 impeller
34 measuring device
35 valve element
35*a* flow area
36 sealing element
36*a* crossbar
37 flow arrow
38 sensor
39 battery holder
39*a* carrier plate
39*b* plug opening
40 batteries
39*c* plug-in pin
39*d* locking washer
41 flow deflection area
41*a* first section
41*b* second section
42 overflow opening
43 holder
44 free space
45 control circuit board
45*a* plug opening
45*b* locking washer 45c plug-in pin
46 housing recess
47 support and screw-through domes
48 screw-in domes
49 connecting screw
50 toothed ring
51 peripheral edge area
52 peripheral edge area
53 sealing element
54 screw-in domes
55 support and screw-through domes
56 connecting screw
56a screw nut
57 recesses
58 support and screw-through dome
59 battery compartment cover
60 screw-in dome
61 fastening screw
62 holding bracket
63 opening edge area
64 container opening
65 containers
66 container interior
67 mounting bracket area
68 support area
69 outer wall
70 first L-leg
71 second L-leg
72 start button
73 input button
74 input button
75 memory button
76 memory button
77 input button
78 recess

The invention claimed is:

1. A dosing device for dispensing a predetermined amount of liquid, the dosing device comprising:
   a housing formed with a liquid inlet, a liquid outlet, and a flow channel flow-connecting said liquid inlet and said liquid outlet;
   a valve element arranged in a flow path of said flow channel and being adjustable between a closed position and at least one open position to selectively block or unblock the flow path towards said liquid outlet;
   a measuring device configured to measure a flow rate of liquid through said flow channel in a direction to said liquid outlet;
   an operating unit for actuating the dosing device;
   a controller having said operating unit or being coupled to said operating unit for signal transmission, said controller being functionally coupled to said valve element and to said measuring device, and said controller being configured to hold said valve element in an open position or moving said valve element to an open position when the dosing device is actuated; and
   a holding bracket being formed or mounted to said housing adjacent a liquid outlet and/or at a bottom of said housing, relative to a vertical axis direction, for holding and/or supporting the dosing device at an opening edge area of a container opening of a container to be filled;
   said holding bracket being designed and arranged at the housing in such a way that the dosing device rests on the opening edge area with a partial area of the dosing device lying outside the container, the dosing device is tilted downwardly and supported with a support area of said holding bracket on an outer wall of the container in a supported state, and a center of gravity of the dosing device in the supported state is outside the container; and
   a counter bearing being provided on said housing which, when the dosing device is in the supported state, bears against the opening edge area from the container interior and is supported there;
   wherein said liquid outlet has an outlet element protruding from said housing and forming said counter bearing.

2. The dosing device according to claim 1, wherein said housing is rod-shaped and/or I-shaped and broadens towards one of two longitudinally opposite housing ends, as viewed transversely to a longitudinal direction and/or in a vertical axis direction, so that said housing has a narrow grip area and a broadened head area adjoining said narrow grip area and opposite thereto, as viewed transversely to the longitudinal direction and/or in the vertical axis direction.

3. The dosing device according to claim 2, wherein:
   said housing, in a top view of said housing, is substantially axially symmetrical with a longitudinal axis of symmetry, with respect to side edges thereof that are opposite to one another in a transverse direction and running in the longitudinal direction, so that:
   said narrow grip area of said housing is delimited by two first side edge areas which run in the longitudinal direction and are spaced apart in the transverse direction opposite to one another, to which, as viewed in the longitudinal direction, a transition area adjoins that extends in each case outwards in a direction away from the axis of symmetry and which broadens the outer contour of said housing in the transverse direction; and
   respective transition areas in turn in each case are adjoined by a second side edge area running in the longitudinal direction, wherein said second side edge areas form the head area that is broadened in the transverse direction with respect to said narrow handle area and are positioned at a greater distance to the axis of symmetry compared to said first side edge areas.

4. The dosing device according to claim 2, wherein:
   said liquid inlet is arranged on a face on one of said two longitudinally opposite housing ends and/or arranged on the narrow handle area on a face of said housing end opposite the broadened head area; and
   said flow channel extends starting from the liquid inlet in the longitudinal direction of said housing into the area of the longitudinally opposite housing end and/or up to the broadened head area and there opens into a lower bottom wall of said housing, wherein a mouth opening thereof forms said liquid outlet or is part of said liquid outlet.

5. The dosing device according to claim 1, wherein said housing is a two-part housing enclosing a cavity as a receiving space and being formed with two shells defining a housing parting plane that is substantially horizontal relative to the vertical axis direction, said two-part housing having an upper housing shell with said operating unit on a visible or outer side, and a lower housing shell which are detachably connected to one another in an assembled state.

6. The dosing device according to claim 5, wherein:
   said flow channel runs in one of said housing shells and is formed in a plurality of parts, at least in areas, with a first wall section that is open at the top towards a respectively other housing shell, which can be closed to form a closed flow path with a removable, covering second wall section; and said covering second wall section is a technology cover on which at least part of said measuring device and/or at least part of said valve element can be supported and/or arranged in such a way that at least part of said measuring device and/or said valve element is arranged in the flow path.

7. The dosing device according to claim 5, wherein:
said flow channel runs and is arranged in said lower housing shell and has a first flow channel section in the narrow handle area which is adjoined by a second flow channel section extending in the broadened head area and which is formed in a plurality of parts at least in the broadened head area, approximately from a transition area to the broadened head area, and has a first, lower wall section that is open upwardly towards the upper housing shell and which can be closed to form a closed flow path with a removable, cover-shaped, second, upper wall section of the second flow channel section;
said cover-shaped upper wall section is a technology cover on which at least part of said measuring device and/or at least part of said valve element is supported and/or arranged in such a way that at least part of said measuring device and/or said valve element is arranged in said flow path of the second flow channel section.

8. The dosing device according to claim 7, wherein said measuring device is arranged in front of and upstream of said valve element, as viewed in a flow direction of the liquid, and/or said liquid inlet is arranged at said housing shell in which said flow channel runs.

9. The dosing device according to claim 7, wherein said second flow channel section opens into a bottom wall of said lower housing shell and said liquid outlet is arranged at a bottom of said housing relative to the vertical axis direction.

10. The dosing device according to claim 7, wherein an area of the second flow channel section formed by said technology cover and said lower wall section is formed with a substantially U-shaped flow deflection area, which is designed such that the liquid flowing in the deflection area from the lower wall section, initially flows in a first section of the flow deflection area upwardly or in a direction towards said technology cover to an overflow area formed in said technology cover, in which a flow deflection takes place before the liquid subsequently, after flowing through the overflow area in a second section of the flow deflection area, relative to the vertical axis direction, again flows downwardly or away from said technology cover to said liquid outlet formed in a bottom wall of said lower housing shell.

11. The dosing device according to claim 10, wherein said valve element is supported at said technology cover, in a tubular holder at an upper side of said technology cover, as viewed in the vertical axis direction, and/or integrated in said flow path in such a way that a closure part of said valve element blocks the flow path in the closed position and unblocks the flow path in an open position.

12. The dosing device according to claim 1, wherein said measuring device is an impeller flow meter and has a rotatably mounted impeller arranged in said flow channel and a sensor which interacts with said impeller and which senses a rotary movement of said impeller and transmits a corresponding signal to a control and evaluation electronics of said controller.

13. The dosing device according to claim 12, wherein:
said impeller is rotatably supported on a technology cover and is arranged in said flow channel in a second flow channel section; and
said sensor is a field-controlled pulse generator arranged in said housing, which converts the rotary movement into a flow-proportional signal and supplies the signal to said control and evaluation electronics.

14. The dosing device according to claim 12, wherein a first flow channel section running in the narrow grip area has a substantially planar upper side, as viewed in the vertical axis direction, and/or forms a support for a battery holder, in which at least one battery is accommodated, which for energy supply is directly or indirectly coupled to the controller and/or to the operating unit and/or to the valve element and/or to the measuring device.

15. The dosing device according to claim 14, which comprises:
said battery holder disposed to extend into an area of said impeller, to rest above said impeller on said technology cover and/or is supported on said technology cover; and
said sensor is arranged on said battery holder and is associated with said impeller.

16. The dosing device according to claim 14, wherein said battery holder together with at least one battery accommodated therein extends in a longitudinal direction, and, in a case of multiple batteries, said batteries are accommodated one behind another in said battery holder in the longitudinal direction, and/or wherein, in said upper housing shell, a removable battery compartment cover is arranged in the area above said battery holder.

17. The dosing device according to claim 1, further comprising a control circuit board of said controller arranged in said housing, said control circuit board having a control and evaluation electronics coupled with said operating unit and/or with said measuring device and/or with said valve element for signal transmission, and/or a display which, in an assembled state of the dosing device, is associated with a housing recess in a visible or outer side as an upper side of said housing.

18. The dosing device according to claim 17, wherein:
the broadened head area protrudes beyond the narrow handle area in the vertical axis direction at a bottom of said housing and wherein a second flow channel section of said flow channel running in said housing on a bottom wall side is offset downwards in the vertical axis direction compared to a first flow channel section of said flow channel likewise running in said housing on the bottom wall side;
a free space is formed in an area above the technology cover; and
said housing on the visible or outer side is smooth and/or planar.

19. The dosing device according to claim 18, where said control circuit board is arranged and accommodated in the free space.

20. The dosing device, when it is held by said holding bracket at the opening edge area of a container opening of a container or vessel to be filled rests on the opening edge area such that the liquid outlet points in the direction of the container interior and said operating unit is freely accessible for actuation from above.

21. The dosing device according to claim 1, wherein said holding bracket has a holding bracket area protruding from the bottom of said housing.

22. The dosing device according to claim 21, wherein a support area of said holding bracket is formed by a holding bracket area protruding from the bottom of said housing.

23. The dosing device according to claim 21, wherein the protruding holding bracket area protrudes at an angle from the bottom of said housing and is inclined in a direction of the liquid outlet side and/or in a direction of a container outer wall.

24. The dosing device according to claim 21, wherein said holding bracket has a mounting bracket area arranged and detachably fixed on said housing, at an area of said liquid outlet, adjoined by said holding bracket area.

25. The dosing device according to claim 24, wherein the holding bracket area protruding from the bottom of said housing is spaced apart from said liquid outlet, as viewed in the longitudinal direction of said housing, and closer to the narrow handle area than said liquid outlet, and said liquid outlet is arranged approximately in a center, on the bottom of the broadened head area.

26. The dosing device according to claim 1, wherein said operating unit of said controller has an operating panel with at least one button and/or with at least one display and/or with at least one viewing window for a display that is arranged on a visible or outer side of said housing.

27. In combination, a container and a dosing device according to claim 1 disposed at an opening edge area of a container opening of said container.

28. A method for dispensing a liquid, the method comprising: providing a dosing device according to claim 1 and dispensing a predetermined amount of liquid with the dosing device.

* * * * *